United States Patent [19]
Benson, Jr.

[11] Patent Number: 5,847,854
[45] Date of Patent: Dec. 8, 1998

[54] FILTERED LIGHT SIGNAL CONTROL SUITABLE FOR TOYS

[75] Inventor: Rambo Benson, Jr., Chesterfield, Mo.

[73] Assignee: Trendmasters, Inc., St. Louis, Mo.

[21] Appl. No.: 691,378

[22] Filed: Aug. 2, 1996

[51] Int. Cl.$^6$ .............................. H04J 14/02; H04J 14/04
[52] U.S. Cl. ......................... 359/147; 359/122; 359/124; 446/175
[58] Field of Search .................................. 359/147, 124, 359/133, 127, 156, 122, 142, 128; 446/175

[56] References Cited

U.S. PATENT DOCUMENTS

| | | | |
|---|---|---|---|
| 2,591,837 | 4/1952 | Lee .......................................... | 359/142 |
| 3,314,189 | 4/1967 | Carroll .................................... | 446/175 |
| 4,865,575 | 9/1989 | Rosnthal ................................. | 446/175 |
| 5,452,901 | 9/1995 | Nakada et al. ......................... | 446/175 |

FOREIGN PATENT DOCUMENTS 8804868  6/1988  WIPO ..................................... 359/147

OTHER PUBLICATIONS

Ayers et al, "solid state optical transmission system", IBM tech disclosure, vol. 12, No. 8, Jan. 1970.

*Primary Examiner*—Leslie Pascal
*Attorney, Agent, or Firm*—Dorsey & Whitney LLP

[57] ABSTRACT

A toy method and apparatus is presented which utilizes a filtered signal to control a toy. A number of signal sources are filtered such that they each provide a signal of a specific wavelength(s) or polarization angle. A number of toys contain similar filters, such that the toys provide a mechanical, visual, acoustical, etc., response to reception of a signal of the wavelength(s) for which they contain the filter. In this manner, signal sources which control one toy cannot interfere with another toy, or parts of same toy, during an interactive game.

6 Claims, 5 Drawing Sheets

FILTERED LIGHT SIGNAL CONTROL SUITABLE FOR TOYS

BACKGROUND OF THE INVENTION

This invention is a filtered signal sensitive control for causing an electrical or mechanical response upon the impingement of a light signal of a certain wavelength(s) or polarization angle, and another response (including no response) upon the impingement of other signals. The invention is advantageously used in an interactive toy configuration and/or as a multiple-channel remote control in a toy.

1. Field of the Invention

A child's imagination is boundless. Children obtain amusement by applying their imaginations to physical objects, such as toys. For example, a child may conduct a mock space battle using model spaceships and alien figures. Toy manufacturers attempt to stimulate a child's imagination by providing different types and configurations of toys, such as dolls, action figures, puzzles, and games.

2. Description of Related Art

Recently, one of the most successful ways to attract and hold a child's attention has been to increase the interactivity of toys. For example, although dolls are still very popular, many of today's dolls are able to change or respond based on the child's manual inputs. Some of the most popular toys today are dolls that cry when the child pulls a string, dolls that laugh when the child pushes their stomach, or any doll that interacts with the child. Thus, any toy with increased interactivity is an improvement over the prior art.

Similarly, remote controlled toys have also become very popular because remote controlled toys gives children the ability to control a device in an imaginative scenario, "empowering" the child. Children therefore enjoy playing with remote control toys, including "driving" remotely controlled cars and boats.

Nothing can make a child happier than a mystery. A toy which works in a manner which the child cannot understand cannot help but stimulate the child's imagination. These toys provide countless hours of entertainment. Currently, there are a number of puzzles and games which appear to be impossible to solve, but which are solvable when a "trick" or "secret move" is discovered. The disadvantage of these games is that the interest level immediately disappears when the trick is discovered. The game or puzzle has forever lost its challenge.

The present invention is designed to stimulate a child's imagination by providing interactivity, remote control, and mystery or "magic."

SUMMARY OF THE INVENTION

The present invention consists of a remotely controlled, filtered light signal sensored and electronic actuator mechanism suitable for toys, which can include multiple filtered light signal sensors. In the present invention, a filtered signal from a remote controller impinging upon a matching filtered signal sensor in a remote unit automatically causes a specific response in the remote unit. The signal(s) are of colored or polarized light, preferably of complementary colors when more than one signal/response feature is used on the same toy or toys used together, or of different polarized angles of light. According to the example embodiments, impingement of a matching filtered light (A) from a remote controller (A) automatically causes a matching remote sensor unit (A) embedded in a toy monster to initiate a roaring noise and to flash lights located in the toy's head. Impingement of filtered light (B) from remote controller (B) causes another matching sensor unit (B) to initiate motorized movements.

The invention described herein is an improvement on the existing types of toys because it provides increased interactivity, remote control, and mystery, while being substantially more economical than radio control. The present invention provides increased interactivity and control because it responds with sight, sound, and/or movement to the child's command via the child's control of the filtered signal source without the child ever touching the toy. Further, the toy presents a mysterious challenge to the child because only a certain filtered signal will make the toy, or certain feature of the toy, respond.

Additionally, the invention is not limited to either one filtered signal input source or to one response. The present invention can provide a plurality of interactive responses based on one more different matching filtered signals to matching sensor triggers. For example, a game can consist of competing toy monsters, each controlled by a different filtered light. Further, each toy can have multiple sensors controlled by the same filtered signal that have different corresponding responses. This provides even more interactivity and mystery for the child as the child is challenged to determine which sensors cause the different responses.

It is an object of the present invention to create a remotely controlled, filtered light signal sensor actuator mechanism suitable for toys.

It is an object of the present invention to create a remotely controlled, multiple filtered light signal sensor and electronic actuator mechanism suitable for toys.

It is an object of the present invention to interact with a child based on a filtered signal input or trigger.

It is an object of the present invention to execute a plurality of responses based on a filtered signal input or trigger.

It is an object of the present invention to create toys that respond automatically to a signal input of a specific wavelength(s), or polarized light angles.

It is an object of the present invention to create toys that upon impingement of properly colored light or angled polarized white light, respond with light, sound, and/or movement features.

DESCRIPTION OF THE PREFERRED EMBODIMENT(S)

The invention is illustrated in a particular embodiment of an interactive or remote control toy configuration. It is understood as the description proceeds that the invention may be realized in different embodiments and may be used in alternative ways.

Figure 1:
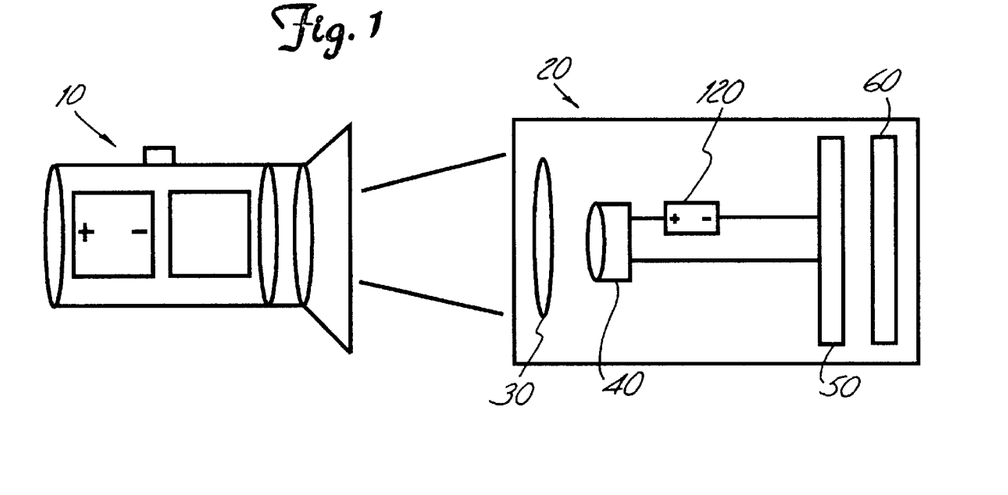
FIG. 1 shows a remote control embodiment of the invention, including a remote controller and remote unit.

FIG. 1 illustrates a diagrammatic representation of the basic invention. A remote controller 10 is shown actuating a remote unit 20. The remote unit 20 contains a filter 30, sensor 40, power source 120, control circuit 50 and actuator 60.

In the embodiment shown in FIG. 1, the remote controller 10 (described in detail below with reference to FIG. 3) is actuated to emit a signal of a certain, specified wavelength (s). Preferably, the signal is colored light, though it may be polarized white light. The wavelength(s) for a light signal can range from the visible light spectrum through the non-visible spectrum. Preferably, the signal is a light of a specific wavelength that corresponds to a color, such as green. Alternatively, the signal may be a light of a certain polarization angle. When the filtered signal impinges upon the remote unit 20, the filter 30 passes signals of only a certain, specified wavelength(s) or polarization angle(s). The spectrum of the signal emitted from the controller 10 overlaps the spectrum of the signal filtered by filter 30 in the remote unit. Preferably, the wavelengths and spectra or polarization angle emitted by remote controller 10 are identical to those passed by filter 30. The filter 30 can be made of any material commonly used for filtering light or polarization angles, as known to person ordinarily skilled in the art. The preferred material for the filter 30 is transparent or translucent cellophane, PVC, a polarizer or a polarized lens.

Therefore, if the remote controller 10 is correctly associated with the remote unit 20, it emits a signal which passes through colored or polarized angle filter 30 and impinges upon sensor 40 (powered by power source 120), which registers in control circuit 50. The remote unit can be designed to have multiple sensors and multiple corresponding responses, as discussed with respect to FIG. 2 below. The signal sensor 40 can be made of any construction known to the artisan of ordinary skill. Preferably, the light sensor is a cadmium sulfate ("CDS") sensor. However, the light sensor may alternatively be any commonly used photocell or photodetector. Additionally, the sensor may be such that is responds to changes in light, such as shadow, as well as to a specific filtered light. The sensor's immunity to broadband light, such as sunlight, incandescent or florescent light, is a function of the darkness of the colored or polarized filter 30 protecting the CDS sensor. In an alternative embodiment (not shown) the sensor's immunity is increased by disposing the sensor in an internal cavity.

The control circuit 50 turns on an actuator 60. The actuator may cause an electrical, mechanical, visual, and/or acoustic response or multiple responses. In accordance with the preferred embodiment of the invention, a signal impinging upon the remote unit that does not pass the filter does not cause any response.

Figure 2:
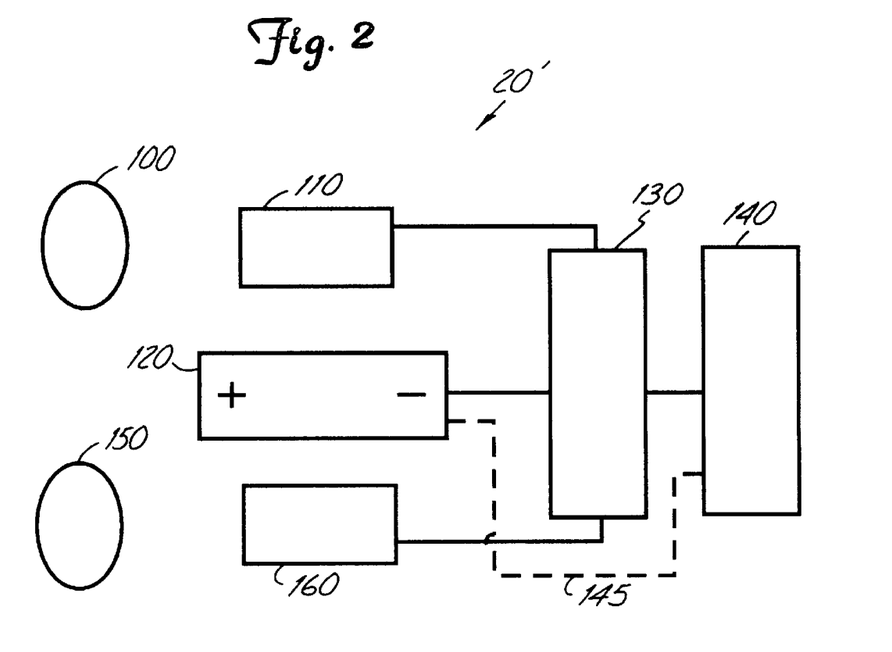
FIG. 2 shows a block diagram of the components of a second embodiment of a remote unit.

As shown in FIG. 2, the remote unit 20' may include multiple sensors, and corresponding filters. Impingement of a matching signal or each of these sensors may cause a different response in the remote unit, as described below.

The remote unit 20' in FIG. 2 contains signal filters 100, 150, sensors 110, 160, power source 120, control circuit 130, and actuator 140. A first signal, passing through the matching first signal filter 100, impinges upon a first signal sensor 110. The signal sensor is electrically connected to and powered by a power source 120. Preferably, the power source is the commonly known two—AA battery powered circuit. Both the power source and the signal sensor are electrically connected to a control circuit 130. When the signal sensor is activated, it sends a signal to the control circuit. In response to this signal, the control circuit causes a response in an actuator 140. The response may be electrical, mechanical, visible, or acoustic. For example, the actuator 140 may be a speaker, light bulb, spring or a motor. The actuator 140 may be powered by the control circuit 130, as shown. Alternatively, dotted line 145 shows that the actuator may also be connected to the power source 120.

The embodiment of FIG. 2 shows a second signal filter 150, which is connected in the same manner as the first signal filter, except that it passes through signals of different specified wavelengths. A signal passing through the filter impinges upon the signal light sensor 160. This signal sensor is electronically connected to the power source and control circuit in the same manner as described previously for the first signal sensor. Preferably, a signal of a certain wavelength(s) that passes through the first filter and causes a response in the actuator does not pass through the second filter and vice-versa. The control circuit 130 causes a response in the actuator 140 which is different depending on the sensor which received the signal. For example, where signal is light, red light detected by the first "red" sensor 110 may cause a toy monster to "roar." Green light detected by the second "green" sensor 120 may cause the toy monster to raise its arms. Although more expensive in certain cases, multiple control circuits 130 (not shown) and/or multiple actuators 140 (not shown) may be used for each signal sensor.

Both of the preceding embodiments of the invention create a mysterious challenge for the child, as the child will have to determine which remote controller activates which signal sensor input mechanisms in the remote unit(s). Additionally, the child could be challenged to determine where such sensor mechanisms are located, and possibly also determine where the remote units are located. The child will also be entertained by the immediate responses of the actuator when it is activated.

While FIG. 2 only shows two sensor input mechanisms into the control circuit, an embodiment of this invention can include only one sensor input mechanism (such as shown in FIG. 1) or as many as desired. Preferably, each signal filter in the multiple-filter embodiment will pass through signals with wavelengths equating to signals which are not contained in the other filter(s). This helps prevent interference between signal sources.

Figure 3:
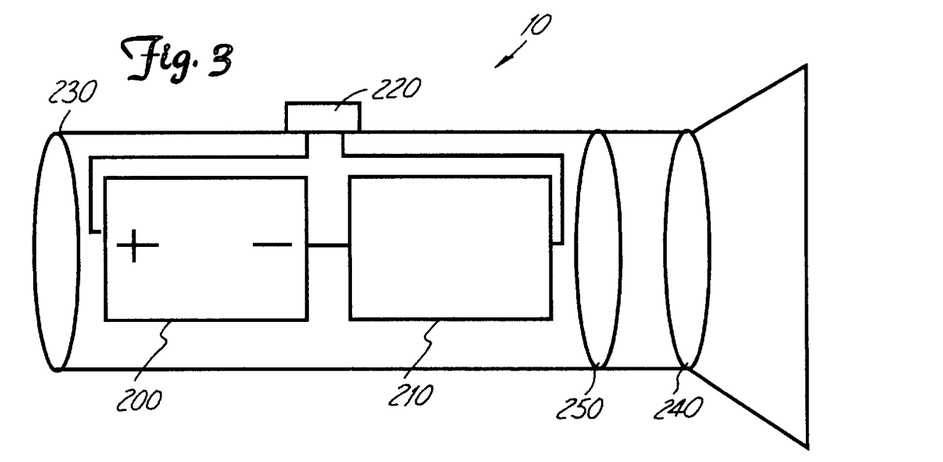
FIG. 3 shows a cross-sectional view of the remote controller shown in FIG. 1.

FIG. 3 is a block diagram showing the preferred embodiment of the remote controller 10 where the signal used is a light signal. The remote controller has a separate power source 200, a signal source, 210, and a control switch 220 which are electrically connected within housing 230. The housing also contains a signal filter 240 and may optionally contain a lens 250, as shown.

Preferably, the power source is a two battery (AA) powered circuit, and the signal source is a light source of common design that can be powered by the power source. The control switch opens and closes this circuit, causing the light to turn on when the circuit is closed. Preferably, the housing 230 is easily opened to permit insertion and replacement of a pair of batteries. A signal filter 240, located in front of the signal source, filters the light to pass through light of a specified wavelength(s) or polarization angle that corresponds with or matches at least one of the remote unit's light filter/light sensor input specifications. Preferably, this signal filter and the filter in the associated remote unit are made of the same material, i.e. cellophane, PVC, or a polarized lens. Alternatively, the two signal filters may be made of different materials commonly used to filter light.

A lens 250 may also be used to focus the light as desired. The lens 250 may be positioned at any desired location where it is necessary to focus light, including within, or external to, the remote unit 20 (not shown). With continuing reference to FIG. 3, lens 250 is shown between the light filter and the light source to focus the light emitted from the light source.

In the preferred embodiment, the child operates switch 220 when it is desired to generate a controlling beam of light. The power source 200 is thereby connected to the light signal source 210, which emits light through lens 250 and filter 240. The output of the controller 10 is filtered light which matches the color or polarization angle of light passed by a filter (30, 100, 150 in FIGS. 1 and 2) in the remote unit 10.

In a preferred embodiment, the remote controller 10, shown in FIG. 3, is shaped internally and externally as a common, small flashlight. However, the exterior of the remote controller 10 is not critical, and may be any suitable shape. Preferably, the housing 230 is made of molded, textured plastic that has a release for easy insertion of two AA batteries, and replacement of the light signal source 210. The light signal source may be a one watt light bulb that is connected to the power source and the control switch. The control switch 220 is a simple slide switch as shown. This type of switch is known in the art.

In FIG. 3, the remote controller is shaped as a flashlight. Alternatively, the exterior of the remote controller may be shaped as a "magic wand" or be shaped to be consistent with the remote unit. For example, if the remote unit were a house, the controller 10 may be shaped like a garage door opener, to actuate the garage doors on the house.

Figure 4:
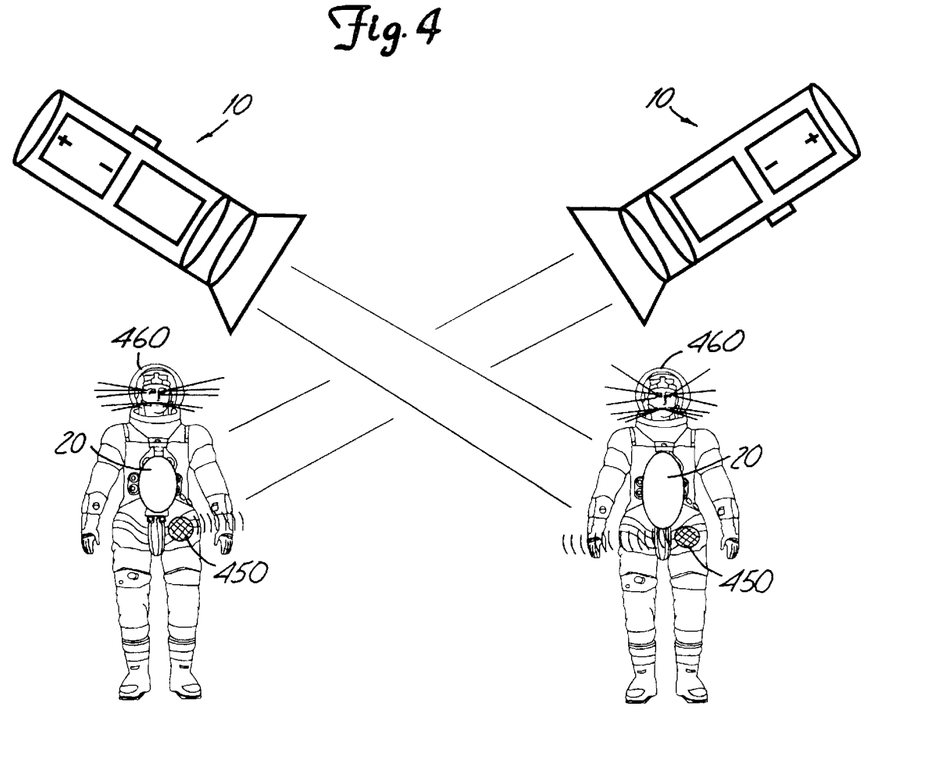
FIG. 4 shows an interactive toy monster embodiment of the invention.

In accordance with the preferred embodiment, two or more such remote controllers emitting light of different wavelengths or polarization angles are used in conjunction with two or more corresponding remote units. This allows for two or more children to play with the remote unit(s) simultaneously, adding increased interactivity and entertainment. FIG. 4 shows such an embodiment.

In FIG. 4, two toy monsters or creatures 300 contains different color filters. Each toy also has a corresponding remote controller 10. When the light from the corresponding remote controller is flashed over the toy's sensor, the controller circuit in the toy causes the actuator to respond. For example, the toy may make a roaring noise, and flash lights in it's eyes and mouth for a certain period of time. In FIG. 4, lights 460 are shown, as are ports for speaker 450. The control of lights and speakers are described below with reference to FIGS. 5 and 6.

Alternatively, the activator may cause the toy to move or shake. Additionally, the activator may cause the toy to reveal a hidden compartment or chamber, possibly revealing or containing therein hidden monsters or monster accessories. In this manner two or more children could engage in a remote controlled monster battle game. Since different complementary color filters or differently angled polarized beam filters are used for each remote unit/remote controller combination, one child cannot inadvertently or purposefully control the other child's toy.

Preferably, this concept is expanded to many related toys, thereby creating a line of toys. Each toy may have a different color or angled polarized beam filter and may respond differently to its light source. For example, one toy may be a huge dinosaur which stamps its feet in response to red light. Another toy may be a smaller creature which darts ahead and "bites" in response to green light. The players attempt to defeat each other, one by attempting to stamp on the small creature and the other by attempting to "bite" the large dinosaur. When the children get tired of this battle, they may add another combatant, for example, a creature which "springs" into the air in response to only to light of a certain polarized angle. This creature would defeat the other two if it jumped on either of them. In this way, children have numerous toys, each with its own advantages and disadvantages, from which to create imaginative scenarios.

As realized by one of ordinary skill, the toys may be more complex. For example, each toy may have advanced capabilities of remote control and numerous actuators. Combinations of multiple complementary color filters and angled polarized filters and matching or grouped multiple detectors may be used, as previously described.

Figure 5:
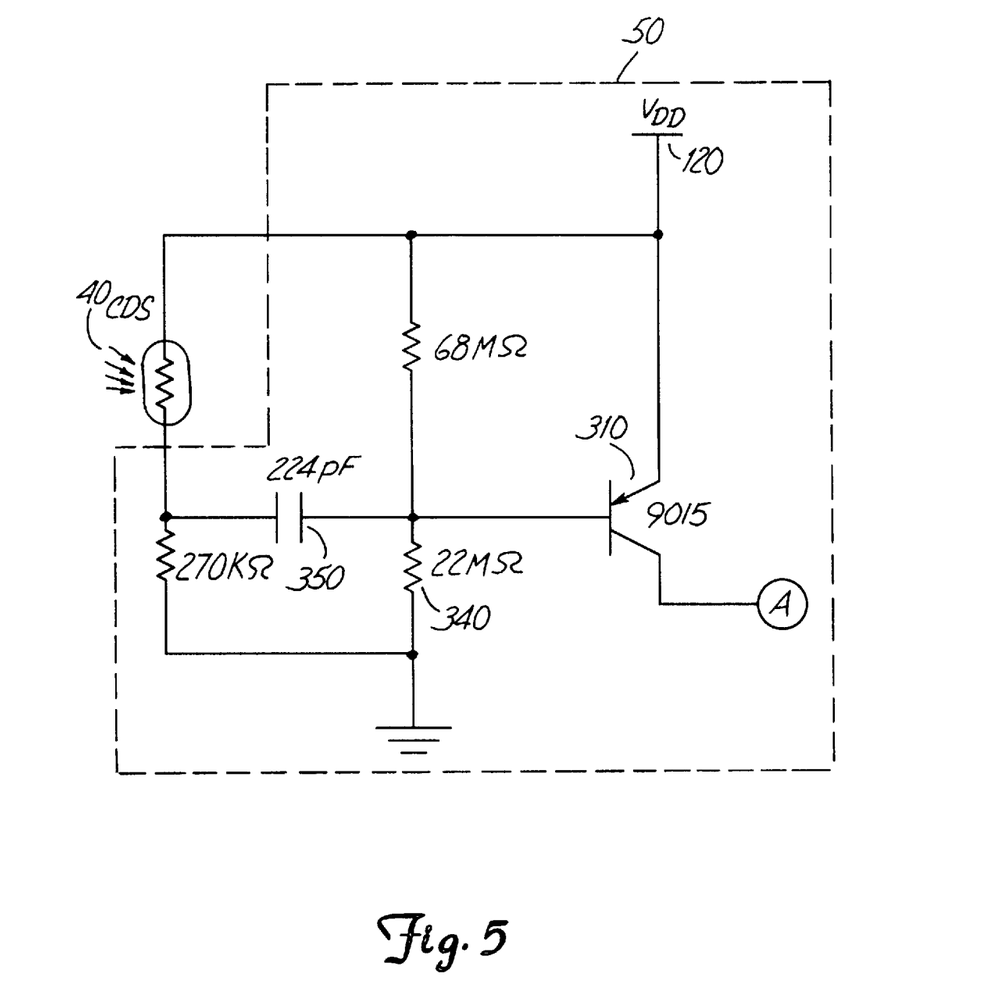
FIG. 5 shows a circuit diagram of the control circuit of the remote unit shown in FIG. 1.
Figure 6:
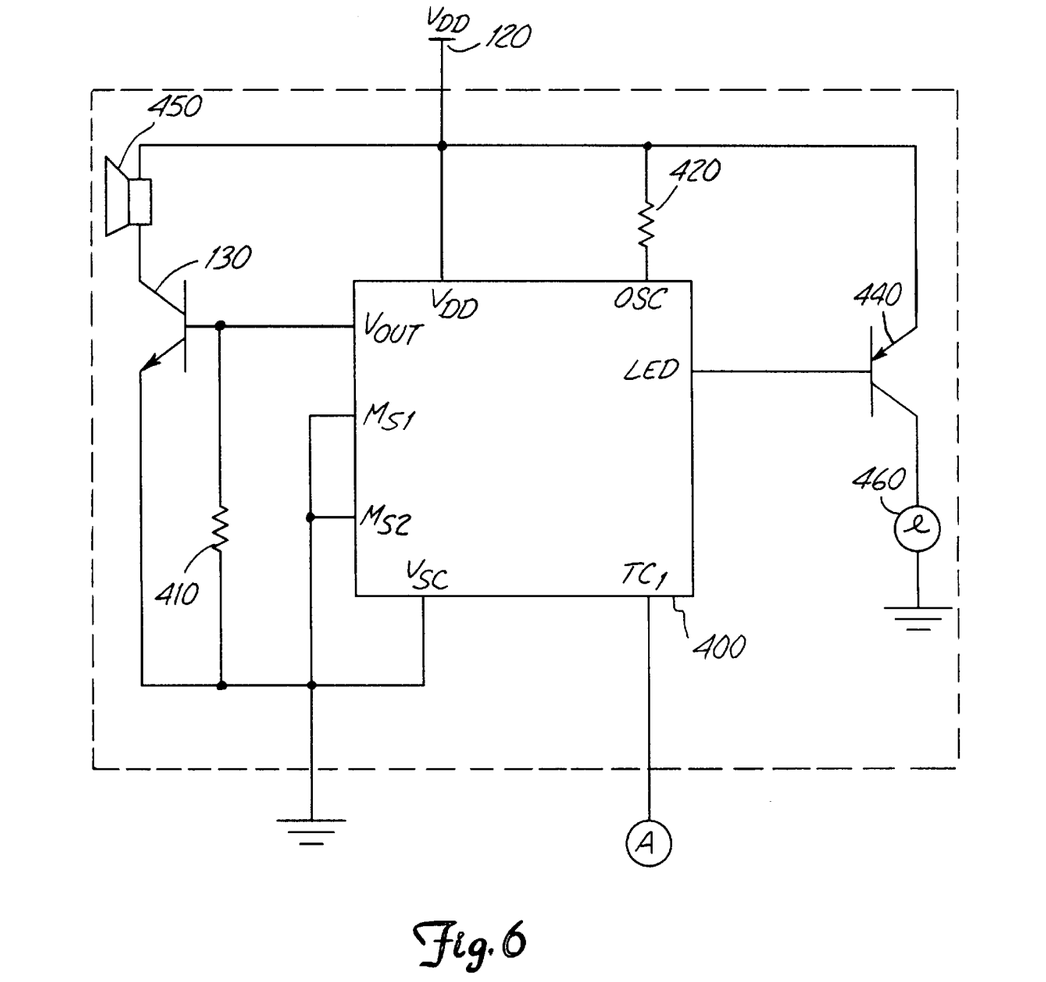
FIG. 6 shows a circuit diagram of the actuator portion of the remote unit shown in FIG. 1.

FIGS. 5 and 6 show circuit diagrams of a preferred embodiment of the remote unit in a toy monster configuration. FIG. 5 shows a control circuit 50 and FIG. 6 shows an actuator circuit 60. These circuits may be used in the FIG. 1 embodiment.

First, with reference to FIG. 5, a control circuit 50 is shown for a toy monster. More specifically, control circuit 50 contains a transistor 310 biased by a resistive network consisting of resistors 320, 330, 340, and also using a capacitor 350 and voltage source 120. The control circuit 50 is connected to CDS sensor 40.

The capacitor 350 is used to prevent DC voltages from affecting the CDS sensor input 40. The power source 120 is connected as VDD to operate the circuit. The circuit will be recognized by the artisan as a commonly known transistor amplifier circuit, which uses a CDS sensor 40 as the input and provides an output at point A from transistor 310's collector.

In the FIG. 5 embodiment, resistor 320 is 270KΩ, resistor 330 is 6.8 MΩ, resistor 340 is 22 MΩ, capacitor 350 is 224 pF, and transistor 310 is a 9015 pnp bipolar junction transistor. $V_{DD}$ is preferably 3.0 V, generated by two 1.5 V AA batteries connected in series (not shown). The artisan recognizes that these components and values are not critical, but any suitable components or values may be used to generate a control voltage or control pulse to activate an actuator.

The control circuit 50 amplifies the signal obtained from CDS sensor 40 to provide a control voltage at point A to trigger the actuator circuit 60. One embodiment of the actuator circuit is shown in detail in FIG. 6.

The actuator circuit 60 shown in FIG. 6 is based on an integrated circuit (IC) 400. The circuit consists of IC 400, resistors 410, 420, transistors 430, 440, speaker 450 and lamp 460. The actuator circuit is connected to power source 120, as schematically shown by $V_{DD}$. The circuit is designed to provide an output from speaker 450 and lamp 460 in response to a control voltage from input A (from the FIG. 5 control circuit 50).

The IC 400 is connected to power source 120 at an input, labeled $V_{DD}$ in FIG. 6. The IC 400 is grounded through connections $M_{S1}$ and $M_{S2}$, as shown. A control voltage is received by IC 400 from output A (FIG. 5) at its input $TC_1$, as shown. An oscillator input (labeled OSC) is used to make the lamp 40 flash on and off, or cause the speaker 450 to turn on and off repeatedly. This input is connected by resistor 420 to $V_{DD}$. Resistor 420 controls the frequency of oscillation. Lamp 460 is connected to transistor 440, which drives the lamp. The transistor 440 is connected to IC 400 at LED port (labeled in FIG. 6) and power source 120 (schematically shown as $V_{DD}$). The speaker 450 is driven by transistor 430, which is connected to and $V_{OUT}$ ports on the IC 400. The transistor 430 is also connected to biasing resistor 410.

In operation, a control voltage is received at $TC_1$ from the control circuit 50. This causes a voltage response at the $V_{OUT}$ and LED ports on the IC 400. Either port may be controlled by an oscillator internal to the IC 400, whose frequency is controlled by resistor 420. The LED output is amplified by transistor 440 to flash lamp 460, causing a visible response to the impingement of light. The $V_{OUT}$ output is amplified by transistor 430 to cause an audible response by speaker 450 in response to the impingement of light. The IC 400 is preprogrammed to provide specific voltages at its LED and $V_{OUT}$ ports, causing specific sounds and specific light flashes. The IC 400 may also be preprogrammed to provide voltages which would cause one or more motorized functions.

Preferably, lamp 460 is located in a toy monster's head. The toy monster preferably has translucent eyes and mouth. When the lamp is activated, it illuminates the monster's eyes and mouth. The speaker 450 is preferably located in the monster's belly or chest, where it emits a "roar" when activated.

In the FIG. 6 embodiment, resistor 410 is 680 Ω, resistor 420 is 1.2 MΩ, speaker 450 is a mini 8 Ω speaker, and lamp 460 is a 40 mA lamp. Transistor 430 is an 8050D npn bipolar junction transistor, while transistor 440 is a 9012 pnp bipolar junction transistor. IC 400 is preferably a 2056 integrated circuit. As with FIG. 5, $V_{DD}$ is preferably 3.0 V, obtained from two 1.5 V AA batteries in series. The artisan recognizes that these components and values are not critical, but any suitable components or values may be used to generate any suitable visible, audible, or mechanical response (or combination of responses).

Figure 7:
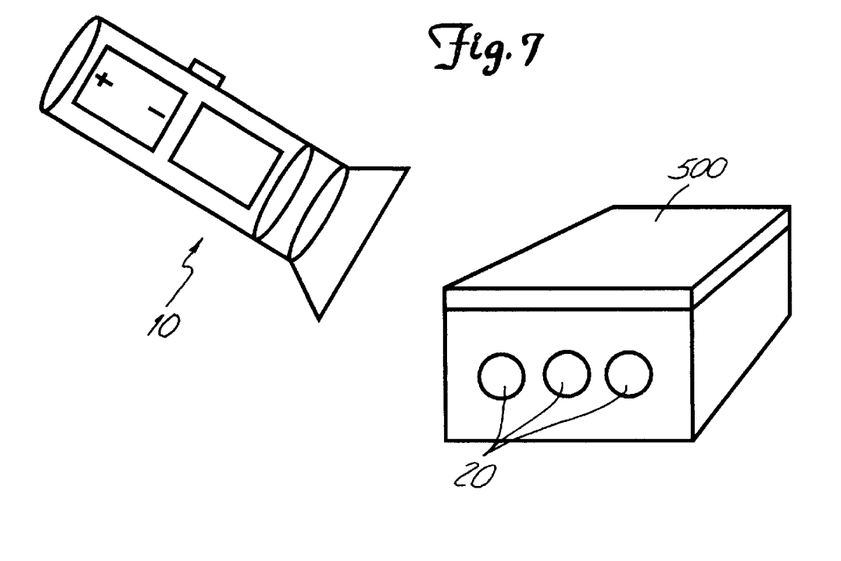
FIG. 7 shows a treasure chest game embodiment of the invention.
Figure 8:
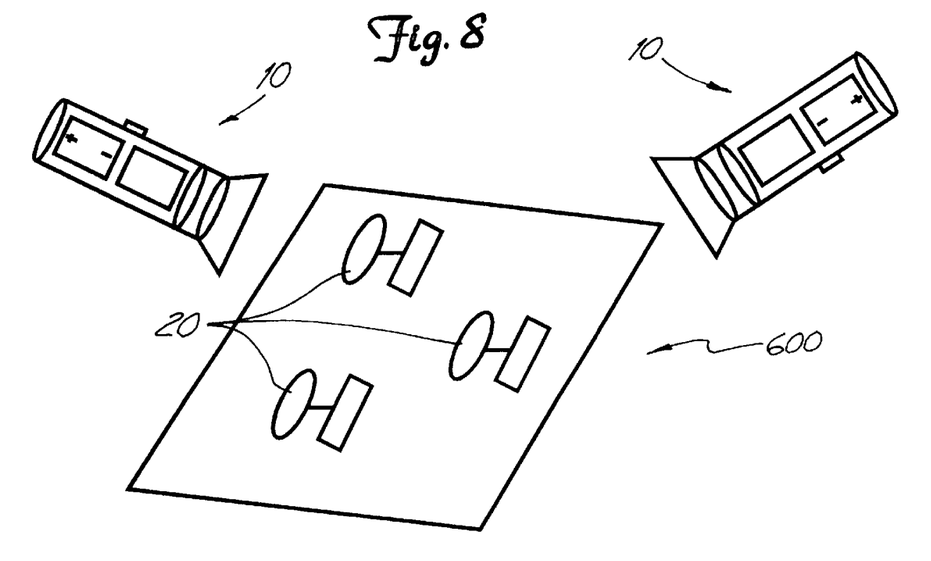
FIG. 8 shows an interactive board game embodiment of the invention.

FIGS. 7 and 8 show alternative embodiments of the invention. FIG. 7 shows an embodiment of the invention for solitary play. A treasure chest 500 contains a remote unit with multiple light filter/light sensor input mechanisms 20. The treasure chest only opens when the remote controller 10 shines it's light upon the same color input. Additionally, the inner compartment of the treasure chest may have secret hidden compartment(s) (not shown) that again may only be accessed by activating the corresponding sensor with the filtered light input or trigger.

FIG. 8 shows an embodiment of the invention in a board game 600. Play of the game is determined by the instructions, warnings, or key game pieces provided when a remote unit 20 on the game is properly activated by the remote controller 10.

Another embodiment of the invention may be in the form of a target shooting game (not shown). In this embodiment, the remote controller is shaped like a firearm.

It will be clear to those in the art that many and varied modifications are apparent to the artisan of ordinary skill. All such variations and modifications are intended to be within the scope of the appended claims.

What is claimed is:

1. A remotely controlled toy, comprising:
    a remote unit that receives a signal for remotely controlling the toy and thereby causes at least one response in the toy, including:
        a first signal filter designed to pass a signal of a first wavelength(s),
        a first signal sensor, arranged to receive a signal which passes through the first filter,
        an actuator wherein a first actuator response causes at least one toy response,
        a first power source, connected to the first signal sensor,
        a control circuit, connected to the power source, the first signal sensor, and the actuator, the control circuit, in response to the impingement of a signal of the first wavelength(s) on the first signal filter and first signal sensor, causing a first actuator response in the actuator,
        a second signal filter, designed to pass a signal of a second wavelength(s),
        a second signal sensor, arranged to receive a signal which passes through the second signal filter and connected to the control circuit and first power source, the control circuit causing a second actuator response in the actuator when a signal of the second wavelength(s) impinges on the second signal filter and the second signal sensor, wherein
            the second actuator response causes at least one toy response,
            the signal of the second wavelength(s) does not pass through the first signal filter, and
            the signal of the first wavelength(s) does not pass through the second signal filter;
    a first remote controller for providing at least one signal for remotely controlling the toy, including:
        a second power sources,
        a first signal source, connected to the second power source,
        a third signal filter, arranged to receive the signal from the first signal source and pass only signals of the first wavelength(s), and
        a first control switch, connected to the second power source and the first signal source, the first control switch switching the signal source on and off, wherein the first remote controller is used to provide the signal of the first wavelength(s) to the first signal filter; and
    a second remote controller, for providing at least one signal for remotely controlling the toy, including:
        a third power source,
        a second signal source connected to the third power source,
        a fourth signal filter, arranged to receive a signal from the second signal source and pass only a signal of the second wavelength(s), and
        a second control switch, connected to third power source and second signal source, which permits a user to switch the second signal source on and off, wherein the second remote controller is used to provide a signal of the second wavelength(s) to the second signal filter, and wherein
        the signal of first wavelength(s) is a light signal of a first color;
        the signal of second wavelength(s) is a light signal of a second color;
        the first and the second signal sensors are light sensors;
        the first and the third signal filters pass light of the first color; and
        the second and the fourth signal filters pass light of the second color.

2. The remotely controlled toy of claim 1, wherein the first and second signal sensors are cadmium sulfate sensors.

3. The remotely controlled toy of claim 1, wherein the first remote controller further comprises:
    a first lens for focusing the filtered light of the first color; and wherein the second remote controller further comprises:
a second lens to focus the light of the second color.

4. The remotely controlled toy of claim 1, wherein the first and second colors are complementary colors.

5. The remotely controlled toy of claim 1, wherein the first color is red and the second color is green.

6. The remotely controlled toy of claim 1, wherein the first remote controller further comprises:

the signal of first wavelength(s) is a light signal of a first polarized angle;

the signal of second wavelength(s) is a light signal of a second polarized angle;

the first and second signal sensors are light sensors;

the first and second signal filters pass light of the first polarized angle; and the third and fourth signal filters pass light of the second polarized angle.

* * * * *

UNITED STATES PATENT AND TRADEMARK OFFICE
CERTIFICATE OF CORRECTION

PATENT NO. : 5,847,854
DATED : December 8, 1998
INVENTOR(S) : Rambo Benson, Jr.

It is certified that error appears in the above-indentified patent and that said Letters Patent is hereby corrected as shown below:

column 6, line 33, "VDD" should read --$V_{DD}$--.

column 8, line 26, "sources" should read --source--

Signed and Sealed this

Twenty-second Day of June, 1999

*Attest:*

Q. TODD DICKINSON

*Attesting Officer*    Acting Commissioner of Patents and Trademarks